B. NUTT.
DEVICE FOR ADVERTISING SPECTACLE LENSES AND THE LIKE.
APPLICATION FILED APR. 19, 1912.
1,061,002.  Patented May 6, 1913.
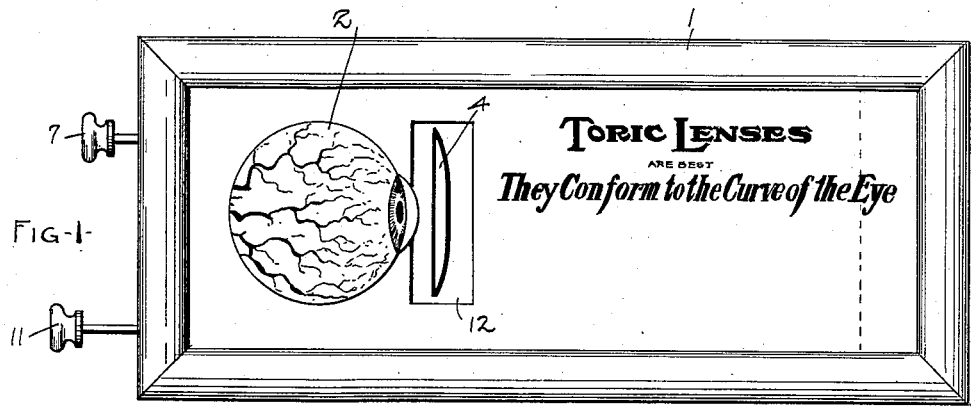
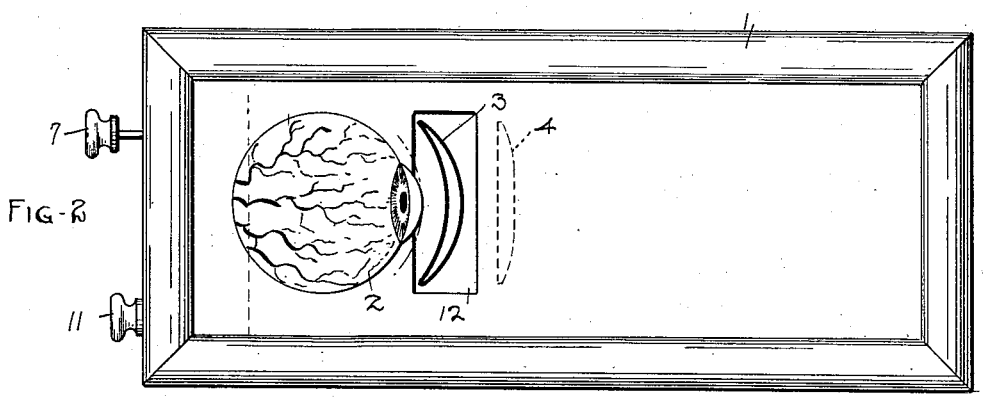
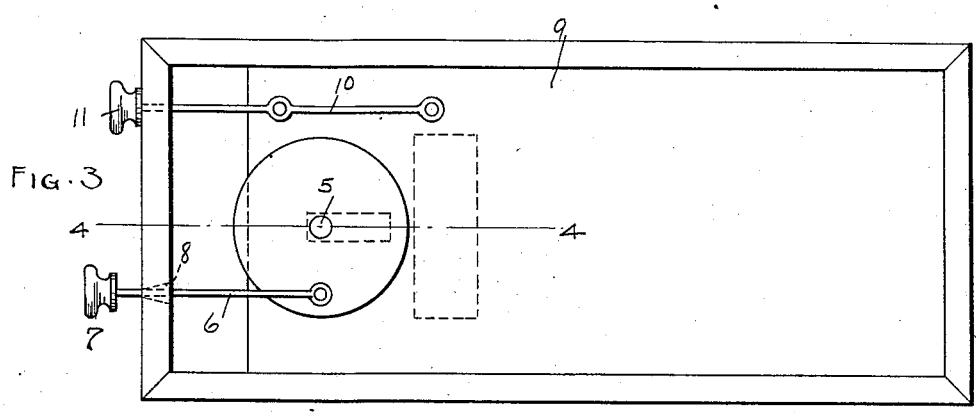
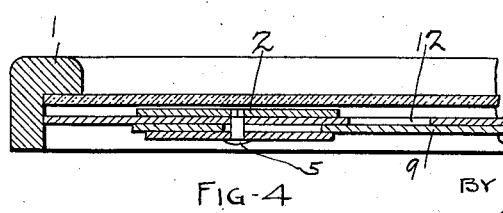

UNITED STATES PATENT OFFICE.

BUELL NUTT, OF CLEVELAND, OHIO, ASSIGNOR TO THE STRONG-KENNARD & NUTT COMPANY, OF CLEVELAND, OHIO, A CORPORATION OF OHIO.

DEVICE FOR ADVERTISING SPECTACLE-LENSES AND THE LIKE.

1,061,002.

Specification of Letters Patent. Patented May 6, 1913.

Application filed April 19, 1912. Serial No. 691,811.

*To all whom it may concern:*

Be it known that I, BUELL NUTT, a citizen of the United States, and a resident of Cleveland, county of Cuyahoga, and State of Ohio, have invented a new and useful Improvement in Devices for Advertising Spectacle-Lenses and the Like, of which the following is a specification, the principle of the invention being herein explained and the best mode in which I have contemplated applying that principle, so as to distinguish it from other inventions.

The object of my invention is to provide a device which will simply and effectively illustrate and advertise the relative advantages of different articles such, for example, as plain and toric lenses for the purpose of eye-glasses.

To the accomplishment of the foregoing and related objects, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawings:—Figure 1 shows a front elevation of my invention in a suitable body or frame; Fig. 2 shows a similar view to Fig. 1, but with another lens before the representation of the eye-ball; Fig. 3 is a rear elevation, and Fig. 4 is a section on the line 4—4 in Fig. 3.

The advantages of the toric lens over the plain lens are, of course, generally known, but I have found that if this advantage can be illustrated in an effective way by some simple demonstration, the lesson is taught and will not be readily forgotton. In the present device I use a body portion or frame 1 which may be similar to a picture frame, and upon which will be shown the representation of an eye-ball 2 and two lenses 3 and 4, the former being a toric lens and the latter a plain lens. Upon such a device I will place some such announcement as that shown in Fig. 1, thus making the device self-advertising and self-explanatory.

It is not enough to merely show the representation of the eye-ball with the lens in position before it, but there must also be shown how this position will be maintained during the movement of the eye from side to side. For this purpose I mount the eye-ball, which may be of glass or metal, upon a pin 5 and attach to the under side of the eye-ball a rod 6 having a button or handle 7, one end of which will extend beyond the boundary of the frame. As the rod is pushed down or brought back, a slight rotary movement is given to the eye-ball which will substantially represent the movements of the human eye when turning. As the movement of the rod 6 is slightly oscillatory, I cut away the bearing 8 for the rod in the upper end of the frame to correspond to this movement.

The representation of the two lenses may be of metal or glass, or any other material which will suitably represent the same, and the two lenses will preferably be attached to a single slide 9 having attached thereto a rod 10 terminating exteriorly of the frame in a button 11. Reciprocation of this button will move the two lenses with respect to the eye, and by placing a card, having an aperture 12, in front of these two lenses, it is possible to show but one lens at a time, and that lens in proper position before the eye-ball.

It is, of course, possible to vary the details of construction to a considerable extent, and in larger devices it is possible to more perfectly finish the parts and so to greatly increase the demonstration presented. For window advertising it may be desirable to form the eye-ball of a hollow disk in which there may be placed an electric light which will shine through a glass representing the pupil of the eye, thus representing more perfectly the adaptability of the toric lenses to the movement of the eye. Such changes of construction do not, however, vary the principles of my invention, as will be readily seen.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of two relatively movable plates, one having an aperture and the other bearing a plurality of indicia respectively adapted to register with such aperture, and an indicating member movable relatively to said first plate adjacent to the aperture therein so as to complement the indicia appearing through such aperture in producing a predetermined effect.

2. In a device of the character described, the combination of an apertured plate, an indicating member movably mounted on one side of said plate adjacent to the aperture therein, and a second plate movably mounted on the opposite side of said first plate and bearing a plurality of indicia respectively adapted to register with such aperture to complement said indicating member in producing a predetermined result.

3. In a device of the character described, the combination of a frame, a slotted plate mounted in said frame, an indicating member movably mounted on said plate, a second plate movably mounted in said frame and bearing indicia adapted to register with such slot in one position of said second plate, whereupon said indicating member is adapted to be moved, thereby complementing such indicia to produce a predetermined effect.

4. In a device of the character described, the combination of two relatively movable plates, one having an aperture and the other bearing representations of various types of lenses respectively adapted to register with such aperture, and a member representing an eyeball movable relatively to said first plate adjacent to the aperture therein so as to illustrate the adaptability of the lens appearing through such aperture to the eyeball.

5. In a device of the character described, the combination of a frame, a slotted plate mounted in said frame, a member representing an eyeball mounted adjacent such slot in said plate, a second plate movably mounted in said frame and bearing at spaced intervals representations of various types of lenses, and means for moving said second plate, whereby said lenses are successively brought into register with said slot, thereby illustrating the adaptability of such lenses to the eyeball.

6. In a device of the character described, the combination of a frame, a slotted plate mounted in said frame, a member representing an eyeball rotatably mounted adjacent such slot in said plate, a second plate movably mounted in said frame and bearing at spaced intervals representations of various types of lenses, means for moving said second plate, thereby bringing said lenses successively into register with such slot and illustrating the adaptability of such lenses to the eye in a definite position, and means for rotating said member representing an eyeball, thereby illustrating the adaptability of such lenses to the eye throughout the range of movement of the latter.

Signed by me this 17th day of April, 1912.

BUELL NUTT.

Attested by—
HORACE B. FAY,
ANNA L. GILL.